United States Patent Office 3,451,802
Patented June 24, 1969

3,451,802
TRIAZINE HERBICIDES
Ralph P. Neighbors, Olathe, and Lee V. Phillips, Overland Park, Kans., assignors to Gulf Research & Development Company, Pittsburgh, Pa., a corporation of Delaware
No Drawing. Filed June 27, 1966, Ser. No. 560,906
Int. Cl. A01n 9/22; C07d 55/12
U.S. Cl. 71—93      2 Claims

ABSTRACT OF THE DISCLOSURE

New triazine herbicides represented by the structural formula

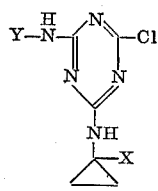

in which X is methyl or hydrogen and Y is cyclopropyl, 1-methylcyclopropyl, isopropyl or ethyl show increased selective phytotoxicity over conventional triazines and are used preferably to control weeds in corn (*Zea mays*).

---

A chemical intermediate which has been very useful in the dye-stuff industry for many years is 2,4,6-trichloro-s-triazine (cyanuric chloride) made by thermal trimerization of cyanogen chloride. The three chloro substituents are quite reactive, the reactivity decreasing, however, with replacement of each substituent, so that various 2-chloro-4,6-disubstituted derivatives of cyanuric chloride are very conveniently synthesized. About 1952, it was discovered that 2-chloro-4,6-bis(alkylamino) - s - triazines possess herbicidal properties. In 1954, the first triazine herbicide was marketed. This compound was 2-chloro-4,6-bis(diethylamino)-s-triazine. It was observed that this compound was effective against a large number of weed species. Since that time, a large number of compounds derived from cyanuric chloride has been synthesized and tested as herbicides. Although hundreds of compounds have reached field testing and test marketing stages, only a few remain useful commercial herbicides, primarily the following four compounds:

2-chloro-4,6-bis(ethylamino)-s-triazine (simazine)
2-chloro-bis(isopropylamino)-s-triazine (propazine)
2-chloro-bis(diethylamino)-s-triazine (chlorazine)
2-chloro-4-ethylamino-6-isopropylamino-s-triazine (atrazine)

Although almost every type of substituent group which can be conveniently placed on the symmetrical triazine nucleus by means of a reaction with cyanuric chloride has been made and tested, the group of only four compounds listed above and possibly one or two others remain the only triazine herbicides of commercial importance. In the investigation of the substituted s-triazines, it has been found that many compounds of this type are almost completely lacking in herbicidal activity and that many of those which possess considerable herbicidal activity are not particularly selective. A fact which has emerged as a result of research on this class of herbicides is that only a few species of plants possess substantial immunity or resistance to the action of those compounds of high herbicidal activity. As a consequence, the triazine herbicides have been found to possess commercial utility in pre-emergent control of weeds in very few crops, primarily corn (*Zea mays*). Although the triazines have been employed for specific weed control tasks, such as crabgrass control in sod, the killing or injury of desirable plant species frequently occurs because high application rates are required.

The limited applicability of triazine herbicides to weed control problems has led to considerable study of the mechanism by which these compounds act as herbicides. Studies with triazines labeled with radioactive tracers indicate that these compounds are readily absorbed by roots and are then transported into the leaves of plants with much less injury to the roots than to the leaves. After absorption of the triazine compound by the plant, oxygen consumption by respiration apparently increases and photosynthesis apparently is inhibited so long as the triazine compound remains present in substantial concentration. In the case of corn plants, apparently the triazine compound is rapidly destroyed by biological processes so that the injury is likely to be only temporary, particularly on large growing plants. This natural resistance of corn and a few other species appears to be associated with high peroxidase activity, while in sensitive species high catalase activity is observed. It appears that the selectivity of the more active triazine herbicides is primarily an inherent property of certain plant species and not of the triazines themselves, since they differ very little in selectivity. Even the plant species which possess the means to decompose triazine herbicides are not completely immune to injury from these substances because of the continued presence in the soil of these compounds, when used as pre-emergent herbicides. The photosynthesis process of young plants, whether resistant or not, is interfered with substantially by this unfortunate persistence of triazine herbicides in the soil. Reduction of corn yields frequently occurs in the growing season subsequent to the one in which the triazine was employed for weed control. This has become a serious problem in the modern practice of repeated growing of corn on the same land.

It has now been discovered that a very small group of 2-chloro-4-cyclopropylamino-s-triazines possess post-emergent herbicidal activity comparable and in some respects superior to the best commercial triazine herbicides and at the same time are greatly improved with respect to persistence in the soil, so that they can be safely used without deleterious effects during subsequent growing seasons. Representative new compounds are the following:

2-chloro-4-cyclopropylamino-6-isopropylamino-s-triazine
2-chloro-4-cyclopropylamino-6-ethylamino-s-triazine
2-chloro-4,6-bis(cyclopropylamino)-s-triazine
2-chloro-4-(1-methylcyclopropylamino)-6-ethylamino-s-triazine
2-chloro-4-(1-methylcyclopropylamino)-6-cyclopropylamino-s-triazine The class of compounds which have been found to be effective post-emergent herbicides with reduced persistence in the soil may be defined as follows:

A compound represented by the structural formula

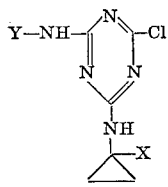

in which X is methyl or hydrogen and Y is selected from the group consisting of cyclopropyl, 1-methylcyclopropyl, isopropyl and ethyl.

The beneficial effect of the cyclopropyl group in the novel compounds is unquestionable. However, the manner in which the desired effect is obtained is not clear and apparently involves other factors. By way of illustration, the compounds represented by the following structural formulas have been found to be almost totally deficient in post-emergent herbicidal effectiveness:

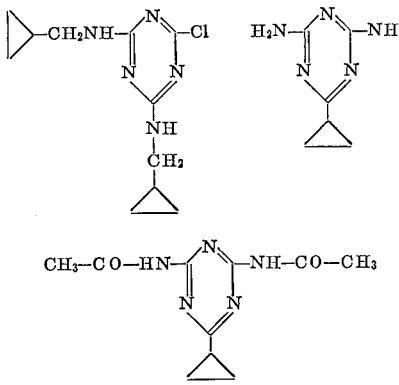

The compound represented by the following structural formula, however, possesses some post-emergent herbicidal activity but of a significantly lower degree than the class of post-emergent herbicidal compounds defined above:

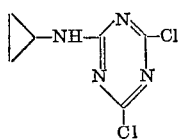

Apparently two amino substituents, at least one of which is cyclopropylamino, are much better than one.

Specific compounds of the defined class have been found to have improved post-emergent activity on certain noxious weeds, for example crabgrass, and are conveniently manufactured by reacting the appropriate primary amines with cyanuric chloride, according to well-known procedures. The methods of preparation and use of the new compositions are illustrated in the discussion which follows.

The following procedure, which employs commercially available starting materials, may be taken as illustrative of the general method of preparation of the novel triazine herbicides of this invention.

Preparation of 2-chloro-4,6-bis(cyclopropylamino)-s-triazine

Cyanuric chloride (18.49, 0.1 mole), acetone (50 ml.), and an ice-water mixture (60 g.) was stirred and cyclopropylamine (11.5 g., 0.2 mole) was added at such rate to maintain the temperature below 30° C. After addition of the cyclopropylamine, the mixture was stirred and cooled to 0° C. A solution of sodium bicarbonate (16.8 g., 0.2 mole) in a minimum of water was then added dropwise at 0-5° C. The mixture was stirred 1 hour, allowing the temperature to rise to 25° C., then warmed slowly to 50° C. over a 30-minute period. After cooling, the crude product was removed by filtration and crystallized from absolute ethanol (800 ml.); M.P. 209–210° C., 15.1 g., yield 67%.

*Analysis.*—Calc'd for $C_9H_{12}ClN_5$: C, 47.89; H, 5.36; Cl, 15.71; N, 31.03. Found: C, 47.84; H, 5.37; Cl, 15.60; N, 31.29.

The following procedure is presented to illustrate the method of preparing 1-methylcyclopropylamine, a substance which is not commercially available. The method as described is believed to be the best for preparation of the substance in high purity, on a laboratory scale. It will be understood that in large scale manufacture, modifications of the method will be desirable for reasons of economy.

Preparation of 1-methylcyclopropylamine

A solution of sodium hypochlorite was prepared by bubbling 20 g. (0.28 mole) of chlorine into a solution of 67.6 g. (1.69 moles) of sodium hydroxide in 500 ml. of water at 0–5° C. To this solution was added a slurry of 27.9 g. (0.28 mole) of 1-methylcyclopropanecarboxamide in 250 ml. of water. After the slurry had stirred for 2 hours at temperatures below 5° C., complete solution resulted. The reaction mixture was permitted to warm slowly to room temperature, and after standing overnight, the solution was heated at 60–80° C. for 2 hours. The reaction vessel was fitted for distillation and 350 ml. of aqueous distillate was collected. This distillate was acidified with 6 N hydrochloric acid and concentrated to a volume of 25–30 ml. by removal of water under reduced pressure. The concentrated solution was slowly added dropwise to 35 g. of potassium hydroxide in a distilling flask. During the addition about 4 g. of liquid distilled. After addition had been completed, the distilling flask was heated and the distillate was collected in an ice cooled receiver. In all 16.8 g. of distillate was obtained. This liquid was dried over barium oxide and redistilled to give 15.5 g., B.P. 58–60° C., $N_D^{20}$ 1.4130.

*Analysis.*—Calc'd for $C_4H_9N$: C, 67.55; H, 12.76; N, 19.70. Found: C, 67.23; H, 12.72; N, 19.55.

The amine was further characterized by reaction with 3,4-dichlorophenyl isocyanate in ether solution to form 1-(1-methylcyclopropyl) - 3 - (3,4-dichlorophenyl) urea which was recrystallized from absolute ethanol to give a product melting at 231–2°.

*Analysis.*—Calc'd for $C_{11}H_{12}Cl_2N_2O$: C, 50.98; H, 4.67; N, 10.81. Found: C, 51.11; H, 4.73; N, 10.85.

EXAMPLES 1 TO 5

Five new triazine compounds were synthesized in accordance with the procedures illustrated above and were then employed as post-emergent and pre-emergent herbicides under controlled test conditions as described below.

An aqueous dispersion of the triazine compound was prepared in each instance by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which the compound was to be tested were planted in four inch pots in the greenhouse. Ten to eighteen days after emergence of the plants, three pots were sprayed with each aqueous dispersion prepared as above at the rate of 5 lb. of the active chemical per acre and a spray volume of 60 gallons per acre. Approximately one week after the spray application the plants were observed and the results rated according to the following schedule:

Type of action

C=chlorosis (bleaching)
N=necrosis

G=growth inhibition
F=formative effect (abnormal form of growth)
K=non-emergence Degree 0=no effect
1=slight effect
2=moderate effect
3=severe effect
4=maximum effect (all plants died)

Results are tabulated below.

noxious grasses, whereas atrazine killed less than half of the test plants.

In an effort to discover the reason for the improved effectiveness of the preferred compound on crabgrass and giant foxtail, comparative tests were made of the effectiveness of this compound and other triazine herbicides as inhibitors of the Hill reaction on isolated turnip chloroplasts. The minimum molar concentration for 50 percent inhibition was found to be only $5.8 \times 10^{-7}$ for the preferred compound, compared with $1.1 \times 10^{-6}$ for atrazine. Although this evidence does not prove conclusively that

| Example No. | Name of compound | Tomato | Cotton | Millet | Grain sorghum | Flax | Soybeans | Corn | Wheat | Oats | Radish | Sugar beets | Alfalfa |
|---|---|---|---|---|---|---|---|---|---|---|---|---|---|
| 1 | 2-chloro-4,6-bis (cyclopropylamino)-s-triazine (M.P. 209–210° C.). | N4 | N4 | N4 | G3, N3 | N4 | N4 | G1 | N4 | N4 | N4 | N4 | N4 |
| 2 | 2-chloro-4-cyclo-propylamino-6-isopropylamino-s-triazine (M.P. 167–168° C.). | N4 | N4 | N4 | G2, N2 | N4 | N4 | N1 | N4 | N4 | N4 | N4 | N4 |
| 3 | 2-chloro-4-ethylamino-6-(1-methylcyclopropylamino)-s-triazine (M.P. 209–210° C.). | N4 | G3, N3 | N4 | G1 | N4 | N4 | G1 | N4 | N4 | N4 | N4 | N4 |
| 4 | 2-chloro-4-cyclopropylamino-6-(1-methylcyclopropylamino)-s-triazine (M.P. 200.5–202° C.). | N4 | N4 | N4 | G1, N1 | N4 | N4 | N1, G1 | N4 | N4 | N4 | N4 | N4 |
| 5 | 2-chloro-4-cyclopropylamino-6-ethylamino-s-triazine (M.P. 199–201° C.). | N4 | N3, G3 | N4 | G2, N1 | N4 | N4 | G1 | N4 | N4 | N4 | N4 | N4 |

The same compounds were tested as pre-emergent herbicides at an application rate of 20 lb. per acre, according to the following procedure.

A solution was prepared by dissolving 290 mg. of the chemical to be tested in 200 ml. of acetone. Disposable paper half-flats were prepared and seeded, then sprayed with the acetone solution at a rate to give 20 lb. of active chemical per acre. One flat, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the flats were examined and plant emergence and effects rated according to the schedule set forth above. Results are tabulated below.

ability to inhibit the Hill reaction accounts for the effectiveness of this compound on giant foxtail and crabgrass, positive correlations between the two properties have been demonstrated experimentally for other herbicides.

By taking advantage of the superior post-emergence effectiveness of the preferred compound on the most troublesome grassy weeds in corn, the application rate can be kept low enough so as to greatly reduce the persistence of herbicide in the soil. A persistence level from repeated use is readily obtained at which no significant reduction in corn yields is observed in successive plantings on the same ground.

What is claimed is:

1. The method of combating weeds which comprises applying to the locus of the weeds a herbicidally effective

| Example No. | Alfalfa | Brome | Flax | Oats | Radish | Sugar Beets | Corn | Coxcomb | Cotton | Crabgrass | Millet | Soybeans |
|---|---|---|---|---|---|---|---|---|---|---|---|---|
| 1 | N4 | N4 | N4 | N4 | N4 | N4 | N2, G2 | N4 | N4 | N4 | N4 | N4 |
| 2 | N4 | N3, G3 | N4 | N3, G3 | N4 | N4 | N2, G2 | N4 | N4 | N4 | N4 | N4 |
| 3 | N4 | N3, G3 | N3, G3 | N3, G3 | N4 | N4 | 0 | N1 | N1, G1 | N3, G3 | N4 | N3, G3 |
| 4 | N4 | N3, G3 | N3, G3 | N4 | N4 | N4 | N1 | N4 | N2, G2 | N3, G3 | N3, G3 | N3, G2 |
| 5 | N4 | G3 | G3 | G3 | N4 | N4 | 0 | N4 | G2 | G3 | N4 | N4 |

The observed results indicated that in general the compounds did not prevent germination of seed but exhibited phytoxic effects as soon as plant roots began to develop. The herbicidal effect is therefore properly classified as an effect on growing plants.

The preferred use of the novel class of compounds is in a method of combating weeds by applying a herbicidally effective amount to the locus of the weeds. In particular, it is preferred to combat the growth of weeds in corn by applying to the locus of the weeds 2-chloro-4-cyclopropylamino-6-isopropylamino-s-triazine at an application rate of from about 1 to 5 pounds per acre. The preference for this compound for weed control in corn is based primarily on superior effectiveness on crabgrass and giant foxtail, in comparison with other triazine herbicides. By way of illustration, at an application rate of 4 lb. per acre in comparative tests along with atrazine, the preferred composition gave a complete kill of these amount of a compound represented by the structural formula

in which X is selected from hydrogen and methyl and Y is selected from the group consisting of cyclopropyl, 1-methylcyclopropyl, isopropyl and ethyl.

2. The method of combating weeds in corn which comprises applying to the locus of the weeds 2-chloro-4-cyclopropylamino-6-isopropylamino-s- triazine at an application rate of from about 1 to 5 pounds per acre.

References Cited

UNITED STATES PATENTS 2,891,855  6/1959  Gysin et al. _____ 71—93
3,352,662  11/1967 Klopping et al. _____ 71—93

OTHER REFERENCES

Ciba, Ltd. "Azido, 1,3,5-triazines," CA 64 (1966) pp. 741–743 (1965). Netherlands 6,413,689 (1965).

Kabbe et al., "4,6-disubstituted 2 amino-1,3,5-triazines," CA 64 (1966) pp. 15900–01. German 1,212,547 (1966).

LEWIS GOTTS, *Primary Examiner.*

G. HOLLRAH, *Assistant Examiner.*

U.S. Cl. X.R.

260—249.8